W. F. KRAUTTER.
MECHANICAL MOTOR.
APPLICATION FILED MAY 27, 1918.
1,310,023.
Patented July 15, 1919.
2 SHEETS—SHEET 2.
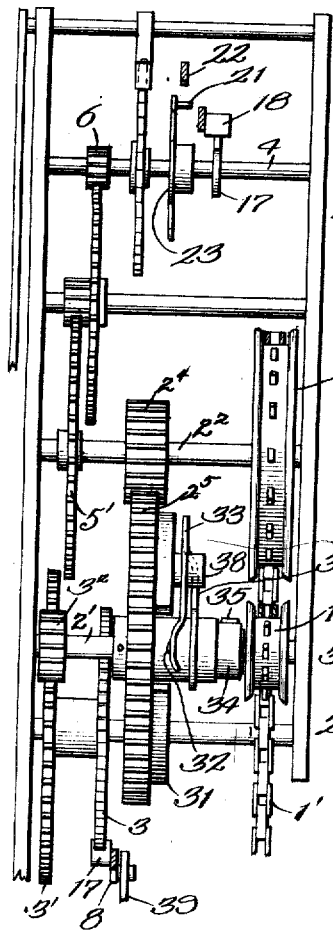
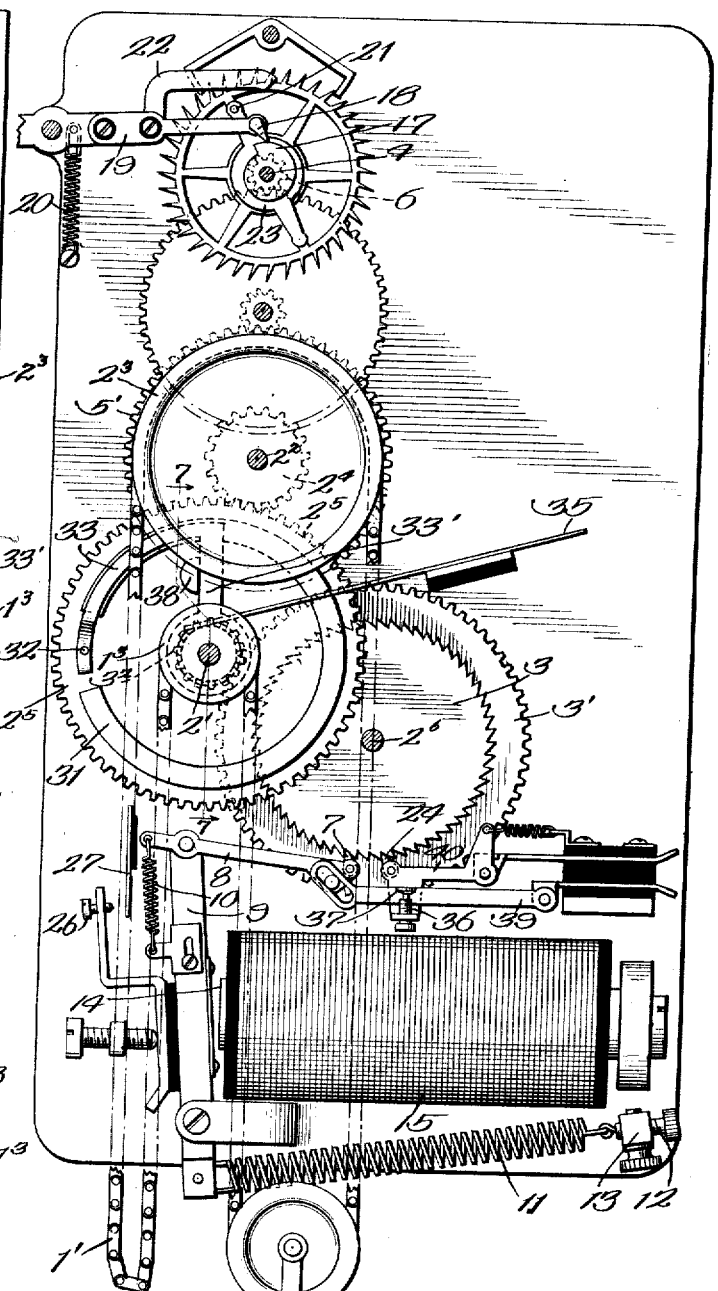
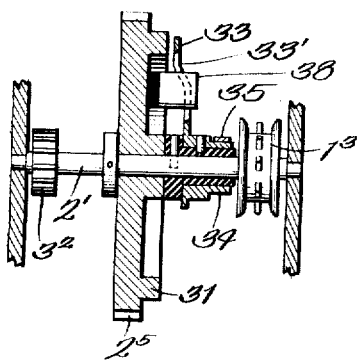

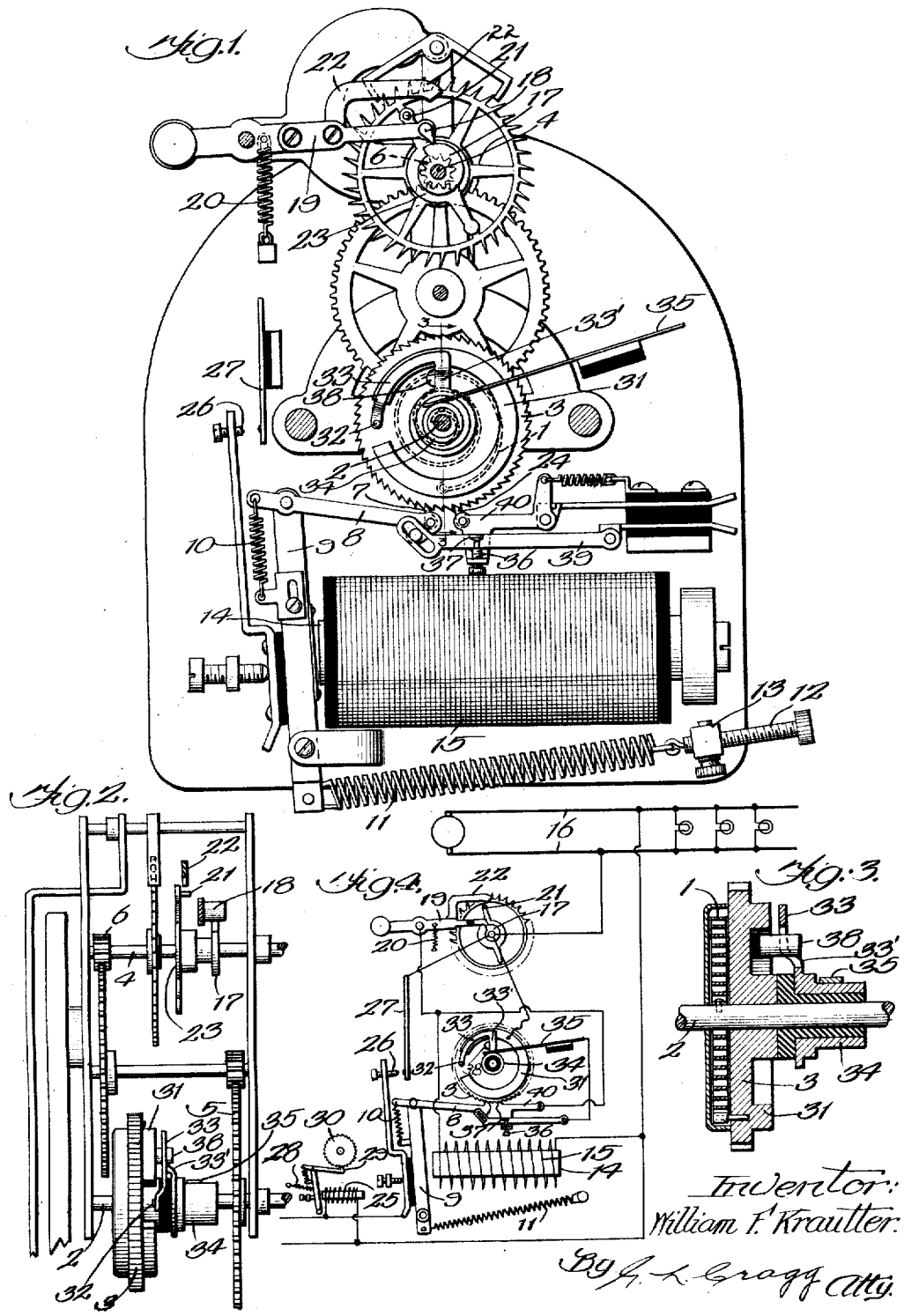

UNITED STATES PATENT OFFICE.

WILLIAM F. KRAUTTER, OF CHICAGO, ILLINOIS, ASSIGNOR, BY MESNE ASSIGNMENTS, TO INTERNATIONAL TIME RECORDING COMPANY OF NEW YORK, OF NEW YORK, N. Y., A CORPORATION OF NEW YORK.

MECHANICAL MOTOR.

1,310,023.

Specification of Letters Patent.   Patented July 15, 1919.

Application filed May 27, 1918.   Serial No. 236,691.

*To all whom it may concern:*

Be it known that I, WILLIAM F. KRAUTTER, citizen of the United States, residing at Chicago, in the county of Cook and State of Illinois, have invented a certain new and useful Improvement in Mechanical Motors, of which the following is a full, clear, concise, and exact description.

My invention relates to mechanical motors and is of particular service in connection with those motors which are employed to mark elapsed periods of time. The invention also relates to the control effected by master mechanical motors of secondary electro-magnetic responsive devices such as time stamps and secondary clocks, the motors of my invention being of particular service when employed in the construction of master clocks.

My invention in its preferred embodiment relates more particularly to a mechanical motor that employs an electro-magnet, a switch for closing the circuit of the electro-magnet, a main spring or an equivalent weight which constitutes a power storage device that furnishes the motive power that is delivered by the motor, a train of speed increasing gears operable by the spring or weight and operatively connecting the spring or weight with the switch whereby the spring or weight periodically closes said switch periodically to energize the magnet. The invention will be most fully described in connection with a mechanical motor employing a main spring. The magnet is preferably employed for winding the spring or otherwise restoring power to the spring after each closure of the switch that has been effected by the spring or weight. This magnet has also been provided with an armature switch intermittently to close the circuit of electro-magnetic step by step mechanism employed in some secondary instrument such as a secondary clock or a time stamp.

The mechanical motors having such electro-magnets are frequently connected with house lighting circuits or other circuits supplied with current by power driven electric current generators. When the motors are thus supplied with current the electro-magnets thereof will fail to operate when the circuits for supplying these magnets with current are interrupted as in case of trouble at the power house or on the line. The main springs, however, are under sufficient tension to perform their functions during protracted periods without requiring rewinding by the magnets, these springs being generally capable of running for over an hour. In order that the magnet of such a spring motor may "catch up" with its work of restoring the main spring to normal tension or of restoring secondary devices to synchronism when the energizing circuit of the magnet is restored, I employ a second and normally inoperative switch for closing the magnet circuit which is also operable by the main spring and mechanism operated by the magnet for normally preventing closure of the second switch but permitting such closure by the main spring when the magnet circuit is inoperative. As I have practised my invention this second and normally inoperative switch has two complemental contact elements movable one along the other. One of these contact elements is operable by the spring for moving it toward the other to effect closing adjustment of the switch while the other contact element is movable by the magnet away from the first to effect and normally maintain opening adjustment of the switch. The contacting faces of these contact elements are preferably relatively long and short whereby one contact is moved along the other by the main spring during the period of inactivity of the magnet to allow the magnet later to operate the number of times the magnet has missed operation while the magnet circuit was inoperative. Where the magnet replenishes the power in the main spring the normal tension of the spring which has partially run down during the period of inoperativeness of the magnet, is restored by the magnet when its energizing circuit is again effective.

Where the main spring is employed to operate secondary devices such as time stamps or secondary clocks through the intermediation of magnets coöperating therewith such magnets may bring the secondary devices to synchronism after periods of inaction of the spring motor magnet and I do not therefore limit my invention to a spring motor in which the main spring is intermittently wound by the magnet.

I will explain my invention more fully by reference to the accompanying drawings showing the preferred embodiment thereof and in which Figure 1 is a front view showing the mechanism of a spring motor of my invention, time indicating devices such as the hour, minute and second hands being omitted from the drawing; Fig. 2 is a side view illustrating a train of speed increasing gears interposed between the main spring and the switch which is normally employed in controlling the magnet circuit; Fig. 3 is a sectional view on line 3—3 of Fig. 1; Fig. 4 is a diagram illustrating one circuit arrangement; Fig. 5 is a side view of a mechanical motor employing a weight instead of a main spring; Fig. 6 is a front view of the structure of Fig. 5; and Fig. 7 is a sectional view on line 7—7 of Fig. 6.

Like parts are indicated by similar characters of reference throughout the different figures.

Referring first to Figs. 1 to 4 inclusive, the main spring 1 of the spring motor is a power storage device and is desirably formed of tape spring metal which is spirally wound. The inner end of this spring is anchored to a shaft 2 which, in the device illustrated, is turned by the spring once a minute, for example. The shaft may carry a minute hand if the spring motor is included in a clock structure. The outer end of the main spring is anchored to a ratchet wheel 3 which is co-axial with but loose upon the shaft 2 so as to be rotatable with respect thereto. Except during the intervals when the spring is being wound, the ratchet wheel 3 is held from rotation, as will appear. In addition to operating the minute shaft 2 directly the spring indirectly operates the "second" shaft 4, the spring performing this latter function through the intermediation of a train of speed increasing gears, illustrated most clearly in Fig. 2, the first gear 5 of such train being fixed upon the minute shaft while the final gear 6 is fixed upon the "second" shaft. If the spring motor is embodied in a clock structure the main spring also operates speed reducing gearing (not shown) to actuate an hour hand. In a clock structure it would require an hour to turn the minute shaft 2 one revolution and a minute to turn the "second" shaft 4 one revolution. To turn the shaft 4 one revolution the shaft 2 is turned one-sixteenth of a revolution by the main spring during the time that the ratchet wheel is held stationary. At the conclusion of each revolution of the shaft 4 and each sixtieth revolution of the shaft 2 the ratchet wheel is turned one-sixtieth of a revolution in a clockwise direction to replenish the power in the spring that was employed to turn the shaft 2 one-sixtieth of a revolution and the shaft 4 a complete revolution.

The actuating pawl 7, mounted upon an arm 8, is employed for the purpose of turning the ratchet wheel step by step, one-sixtieth of a revolution per step. The pawl carrying arm 8 is pivoted upon the upper end of the armature 9. A spring 10 maintains the pawl in engagement with the ratchet. The ratchet turning movement is imparted to the pawl 7 by means of a coiled spring 11 having one end attached to the armature and the other end suitably anchored to a screw 12 threaded in a post 13. The magnet having the armature 9 is provided with a core 14 about which a winding 15 is disposed. This winding is shown in Fig. 4 as being in normally open bridge of the house lighting circuit 16. The circuit of this magnet is closed once a minute to place the spring 11 under increased tension once a minute. The opening of the magnet circuit quickly follows its closure to permit the spring 11 to pull the pawl 7 to the left to turn the ratchet wheel 3 a tooth space. The switch that closes the magnet circuit is, therefore, operated once a minute. The mechanism for operating this switch is desirably inclusive of a cam 17 fixed upon the shaft 4. A rider 18 engages the periphery of this cam and is carried upon an arm 19 which is pulled downwardly by a spring 20 to maintain the rider upon the cam. One side of the circuit 16 is connected with the contact post 21 and the other side of the circuit 16 is connected through the magnet winding 15 with the contact 22 that is complemental to the contact 21. The contact 22 is also carried by the arm 19. The contact post 21 is mounted upon a carrier 23 that is fixed upon the shaft 4. Once in each revolution of this shaft the post 21 is presented to the contact 22, this presentation occurring just as the rider 18 drops from the high point of the cam 17 whereupon the normally open bridge that includes the magnet winding 15 is completed by the dropping of the contact 22 upon contact post 21. When this bridge is established the magnet is energized to attract its armature 9 to bring the pawl 7 into engagement with a fresh ratchet tooth and to place the spring 11 under increased tension, shortly whereafter the contact 21 is turned from beneath the contact 22 to open the magnet circuit and permit the spring 11 to actuate the pawl 7 and thereby turn the ratchet wheel 3 a sixtieth of a revolution. The holding dog 24 prevents reverse rotation of the ratchet wheel during the time that the pawl 7 is moving forwardly to engage a fresh ratchet tooth.

In addition to winding the main spring 1 the winding magnet may also control the operation of electro-magnetic step by step mechanism such as a secondary clock or time stamp, this secondary device being operated in unison with the master device. The secondary element illustrated includes an electro-magnet 25 which may be also in normally open bridge of the circuit 16, this bridge being closed upon each energization of the winding magnet by means of an armature switch having one contact 26 upon the armature 9 and a complemental contact 27 normally separated from the contact 26. Each time the magnet 25 is operated it will place a spring 28 under increased tension and each time this magnet is deënergized upon the separation of the contacts 26, 27 the spring 28 will operate a pawl 29 to turn a ratchet wheel 30 a tooth space. The time stamp or other timing device is operated by the ratchet wheel 30 or the shaft on which this wheel is disposed as is well understood by those skilled in the art.

The ratchet wheel element 3 of the step by step mechanism which is operated by the main spring winding magnet operates and preferably carries the segmental contact element 31 of a second and normally inoperative switch which, when operative, is adapted to close circuit through the coil 15 of the winding magnet. This contact 31 is desirably fixed upon the ratchet wheel 3 and is concentric therewith. The contact 32 which is complemental to the contact 31 is carried upon an arm 33 which moves with the shaft 2, this contact therefore being acuated by the main spring 1 in unison with the minute shaft 2. A slip ring 34 is in electrical and mechanical connection with the arm 33 and is engaged by a contact brush 35 for connecting the contact 32 with one terminal of the winding 15 of the winding magnet and through this winding with one side of the supply circuit 16, a circuit interrupting device 36, 37, later to be mentioned, being included between the brush 35 and the winding 15. The other side of the supply circuit 16 is connected with the segmental contact 31. The contacts 31 and 32 are normally separated so that the switch that includes these contacts in its construction is normally ineffective. The contact 32 is operable by the main spring 1 to move it clockwise toward the contact 31, and if this movement is of sufficient extent closing adjustment of the switch 31, 32 will be effected. The contact 31 is movable clockwise by the step by step mechanism element 3 away from the contact 32 to effect circuit opening adjustment of the switch 31, 32 and normally to maintain such circuit adjustment. Each time the main spring 1 turns the shaft 2 and the ratchet wheel 3 a sixtieth of a revolution (or a tooth space of the ratchet wheel) the radial branch 33¹ of the arm 33 is withdrawn from the post or stop 38 which is carried upon but insulated from the wheel 3. Each time the winding magnet turns the wheel 3 a tooth space the post 38 is restored to engagement with the radial branch 33¹ of arm 33. This post prevents the advance of the contact 31 into engagement with the contact 32, the contact 32 being the contact which is advanced into engagement with its complemental contact 31 when the switch 31, 32 is to function. Moreover, the post 38 serves positively to define the relative positions of the contacts 31 and 32 when they are in their normally separated relation, the relative motion normally permitted by this post between the contacts 31 and 32 being insufficient to enable these contacts to come together.

In the normal operation of the apparatus the switch 21, 22 is periodically closed by the main spring 1 operating through the train of speed increasing gears, the spring winding magnet being energized upon each operation of said switch with the results hitherto stated. If for some reason the circuit 16 should be opened for an appreciable length of time the switch 21, 22 will be ineffective. During the time that this switch is ineffective rotation of the minute shaft 2 about a thirtieth of a turn will bring the contact 32 upon the contact 31. The contacting faces of the contacts 31, 32 are relatively long and short so that the contact 32 will move along the contact 31 while the switch 21, 22 is inoperative. When the circuit 16 is restored the magnet winding 15 will be rapidly energized and deënergized by the circuit that includes the circuit interrupting device 36, 37, the brush 35, and the contacts 31, 32. As a consequence of this rapid energization and deënergization of the magnet winding 15, the contact 31 will be withdrawn step by step from beneath the contact 32 until the post 38 engages the radial branch 33¹ of the arm 33. During such movement of the contact 31 power will be replenished to normal in the main spring 1 and any secondary devices which are controlled by the winding magnet will be brought to synchronism. I prefer the interrupter 36, 37 illustrated as such an interrupter may be operated by the spring winding magnet but I do not wish to be limited to a circuit interrupter that is operated by such magnet.

The contact 37 of the interrupting device is carried upon the pivoted arm 39 that has pin and slot connection with the arm 8 while the contact 36 is carried upon the same arm 40 which carries the holding dog 24, this circuit interrupting device being that which is disclosed in Patent No. 929,744, issued August 3, 1909 to E. E. Yaxley.

The embodiment of the invention shown in Figs. 5 to 7 inclusive is the equivalent of the construction shown in Figs. 1 to 4 inclusive, like parts being given similar characters of reference, the spring 1 being replaced by a weight and chain $1^2$, $1^1$. The chain passes over sprockets $1^3$, $2^3$ respectively fixed upon shafts $2^1$, $2^2$. The weight turns the sprocket wheel $2^3$ in a clockwise direction to turn the spur gear $5^1$ (fixed upon shaft $2^2$) in a similar direction, this being the first gear of the train that terminates in the pinion 6 which, similarly to the construction of Figs. 1 to 4 inclusive, is fixed upon the shaft 4. The spur pinion $2^4$ is fixed upon the shaft $2^2$ and is in mesh with a spur gear $2^5$ co-axial with but loose upon the shaft $2^1$. As the shaft $2^2$ is turned in a clockwise direction the spur gear $2^5$ is turned in a counter clockwise direction, this spur gear $2^5$ carrying the segmental contact 31 which is moved counter clockwise by the power storage device (the weight $1^2$) whereas in the other construction the power storage device (the spring 1) moves the contact 32. The shaft $2^6$ upon which the ratchet wheel 3 is fixed carries a spur gear $3^1$ which is fixed thereon, each spur gear $3^1$ meshing with a spur pinion $3^2$ fixed upon the shaft $2^1$ and with relation to the sprocket pinion $1^3$. Each time the magnet is operated the ratchet wheel 3 is turned a tooth space, the spur gear $3^1$ being correspondingly turned to turn the shaft $2^1$ and the sprocket pinion $1^3$ counter-clockwise to lift the weight to its initial height and thereby replenish the power which was spent in the descent of the weight. The turning of the shaft $2^1$ effects the turning of the contact arm 33 and the contact 32 in a counter-clockwise direction. The contact 32 in the construction of Figs. 5 to 7 inclusive is thus turned by the electro-magnet which, in the form shown in Figs. 1 to 4, turns the contact 31. The left hand portion of the chain extending between the sprockets $2^3$ and $1^3$ is extended in length to afford a surplus slack which is absorbed or partially absorbed when switch 21—22 is inoperative. A further description of the embodiment of the invention shown in Figs. 5 to 7 inclusive is not thought to be necessary since the parts therein that are numbered similarly to the parts in Figs. 1 to 4 inclusive perform similar functions.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. The combination with an electro-magnet; of an energizing circuit therefor; a switch for closing said circuit; a power storage device in actuating relation to said switch, said magnet being in power restoring relation to the power storage device to replenish the power stored therein after its actuation of the switch; a second switch for closing the magnet circuit and also operable by said power storage device; and mechanism operated by the magnet for normally preventing closure of the second switch, but permitting such closure when the magnet circuit is inoperative.

2. The combination with an electro-magnet; of an energizing circuit therefor; a switch for closing said circuit; a power storage device; a train of speed increasing gears operated by the power storage device and operatively connecting the power storage device with the switch whereby the power storage device periodically closes said switch, said magnet being in power restoring relation to the power storage device to replenish the power stored therein after its actuation of the switch; a second switch for closing the magnet circuit and also operable by said power storage device; and mechanism operated by the magnet for normally preventing closure of the second switch, but permitting such closure when the magnet circuit is inoperative.

3. The combination with an electro-magnet; of an energizing circuit therefor; a switch for closing said circuit; a power storage device in actuating relation to said switch, said magnet being in power restoring relation to the power storage device to replenish the power stored therein after its actuation of the switch; and a second and normally inoperative switch for closing the magnet circuit and having two complemental contact elements, one operable by the power storage device for moving it toward the other to effect closing adjustment of this switch and the other operable by the magnet to move it away from the first to effect and normally maintain opening adjustment of this switch.

4. The combination with an electro-magnet; of an energizing circuit therefor; a switch for closing said circuit; a power storage device; a train of speed increasing gears operable by the power storage device and operatively connecting the power storage device with the switch whereby the power storage device periodically closes said switch, said magnet being in power restoring relation to the power storage device to replenish the power stored therein after its actuation of the switch; and a second and normally inoperative switch for closing the magnet circuit and having two complemental contact elements, one operable by the power storage device for moving it toward the other to effect closing adjustment of this switch and the other operable by the magnet to move it away from the first to effect and normally maintain opening adjustment of this switch.

5. The combination with an electro-magnet; of an energizing circuit therefor; a switch for closing said circuit; a power storage device in actuating relation to said switch, said magnet being in power restoring relation to the power storage device to replenish the power stored therein after its actuation of the switch; a second and normally inoperative switch for closing the magnet circuit and having two complemental contact elements movable one along the other, the contacting faces of said contact elements being relatively long and short, one contact element being operable by the power storage device for moving it toward the other to effect closing adjustment of this switch and the other being operable by the magnet to move it away from the first to effect and normally maintain opening adjustment of this switch; and an interrupter for the magnet circuit to effect the repeated operation of the magnet and successive movements of the switch element operable thereby.

6. The combination with an electro-magnet; of an energizing circuit therefor; a switch for closing said circuit; a power storage device; a train of speed increasing gears operable by the power storage device and operatively connecting the power storage device with the switch whereby the power storage device periodically closes said switch, said magnet being in power restoring relation to the power storage device to replenish the power stored therein after its actuation of the switch; a second and normally inoperative switch for closing the magnet circuit and having two complemental contact elements movable one along the other, the contacting faces of said contact elements being relatively long and short, one contact element being operable by the power storage device for moving it toward the other to effect closing adjustment of this switch and the other being operable by the magnet to move it away from the first to effect and normally maintain opening adjustment of this switch; and an interrupter for the magnet circuit to effect the repeated operation of the magnet and successive movements of the switch element operable thereby.

7. The combination with an electro-magnet; of an energizing circuit therefor; a switch for closing said circuit; a power storage device in actuating relation to said switch, said magnet being in power restoring relation to the power storage device to replenish the power stored therein after its actuation of the switch; step by step mechanism operated by the magnet; a second and normally inoperative switch for closing the magnet circuit and having two complemental contact elements movable one along the other, the contacting faces of said contact elements being relatively long and short, one contact element being operable by the power storage device for moving it toward the other to effect closing adjustment of this switch and the other being operable by said step by step mechanism to move it away from the first to effect and normally maintain opening adjustment of this switch; and an interrupter for the magnet circuit to effect the repeated operation of the magnet to operate said step by step mechanism to effect successive movements of the switch element which is operable by the step by step mechanism.

8. The combination with an electro-magnet; of an energizing circuit therefor; a switch for closing said circuit; a power storage device; a train of speed increasing gears operable by the power storage device and operatively connecting the power storage device with the switch whereby the power storage device periodically closes said switch, said magnet being in power restoring relation to the power storage device to replenish the power stored therein after its actuation of the switch; step by step mechanism operated by the magnet; a second and normally inoperative switch for closing the magnet circuit and having two complemental contact elements movable one along the other, the contacting faces of said contact elements being relatively long and short, one contact element being operable by the power storage device for moving it toward the other to effect closing adjustment of this switch and the other being operable by said step by step mechanism to move it away from the first to effect and normally maintain opening adjustment of this switch; and an interrupter for the magnet circuit to effect the repeated operation of the magnet to operate said step by step mechanism to effect successive movements of the switch element which is operable by the step by step mechanism.

9. The combination with an electro-magnet provided with an armature switch; of an energizing circuit therefor; a switch for closing said circuit, a power storage device in actuating relation to the second switch; a third switch for closing the magnet circuit and also operable by said power storage device; mechanism operated by the magnet for normally preventing closure of the third switch, but permitting such closure when the magnet circuit is inoperative; and electro-magnetic step by step mechanism having a circuit intermittently closed by said armature switch.

10. The combination with an electro-magnet provided with an armature switch; of an energizing circuit therefor; a switch for closing said circuit; a power storage device; a train of speed increasing gears operable by the power storage device and operatively connecting the power storage device with the second switch whereby the power storage device periodically closes said second switch; a third and normally inoperative switch for closing the magnet circuit and having two complemental contact elements, one operable by the power storage device for moving it toward the other to effect closing adjustment of this switch and the other operable by the magnet to move it away from the first to effect and normally maintain opening adjustment of this switch; and electro-magnetic step by step mechanism having a circuit intermittently closed by said armature switch.

11. The combination with an electromagnet provided with an armature switch; of an energizing circuit therefor; a switch for closing said circuit; a power storage device; a train of speed increasing gears operable by the power storage device and operatively connecting the power storage device with the second switch whereby the power storage device periodically closes said second switch; step by step mechanism operated by the magnet; a third and normally inoperative switch for closing the magnet circuit and having two complemental contact elements movable one along the other, the contacting faces of said contact elements being relatively long and short, one contact element being operable by the power storage device for moving it toward the other to effect closing adjustment of this switch and the other being operable by said step by step mechanism to move it away from the first to effect and normally maintain opening adjustment of this switch; an interrupter for the magnet circuit to effect the repeated operation of the magnet to operate said step by step mechanism to effect successive movements of the switch element which is operable by the step by step mechanism; and electro-magnetic step by step mechanism having a circuit intermittently closed by said armature switch.

12. The combination with an electro-magnet; of an energizing circuit therefor; a switch for closing said circuit; a power storage device in actuating relation to said switch; a second switch for closing the magnet circuit and also operable by said power storage device; and mechanism operated by the magnet for normally preventing closure of the second switch, but permitting such closure when the magnet circuit is inoperative.

13. The combination with an electromagnet; of an energizing circuit therefor; a switch for closing said circuit; a power storage device; a train of speed increasing gears operable by the power storage device and operatively connecting the power storage device with the switch whereby the power storage device periodically closes said switch; and a second and normally inoperative switch for closing the magnet circuit and having two complemental contact elements, one operable by the power storage device for moving it toward the other to effect closing adjustment of this switch and the other operable by the magnet to move it away from the first to effect and normally maintain opening adjustment of this switch.

14. The combination with an electromagnet; of an energizing circuit therefor; a switch for closing said circuit; a power storage device; a train of speed increasing gears operable by the power storage device and operatively connecting the power storage device with the switch whereby the power storage device periodically closes said switch; step by step mechanism operated by the magnet; a second and normally inoperative switch for closing the magnet circuit and having two complemental contact elements movable one along the other, the contacting faces of said contact elements being relatively long and short, one contact element being operable by the power storage device for moving it toward the other to effect closing adjustment of this switch and the other being operable by said step by step mechanism to move it away from the first to effect and normally maintain opening adjustment of this switch; and an interrupter for the magnet circuit to effect the repeated operation of the magnet to operate said step by step mechanism to effect successive movements of the switch element which is operable by the step by step mechanism.

15. The combination with an electromagnet; of an energizing circuit therefor; a switch for closing said circuit; a second switch for closing the magnet circuit; mechanism for operating said switches; and mechanism operated by the magnet for normally preventing closure of the second switch, but permitting such closure when the magnet circuit is inoperative.

In witness whereof, I hereunto subscribe my name this 24th day of May, A. D., 1918.

WILLIAM F. KRAUTTER.

Copies of this patent may be obtained for five cents each, by addressing the "Commissioner of Patents, Washington, D. C."